United States Patent [19]

Nenstiel

[11] Patent Number: 5,201,480
[45] Date of Patent: Apr. 13, 1993

[54] SAFE START

[76] Inventor: Frank S. Nenstiel, P.O. Box 91222, Long Beach, Calif. 90809-1222

[21] Appl. No.: 750,242

[22] Filed: Aug. 27, 1991

[51] Int. Cl.$^5$ .............................................. B64F 1/16
[52] U.S. Cl. ................................... 244/110 R; 188/32
[58] Field of Search .................... 244/110 R, 50, 115, 244/116, 114 R, 108; 410/30, 10, 11, 23; 188/29, 32, 4 R, 36; 70/226, 225, 229, 232, DIG. 57

[56] References Cited

U.S. PATENT DOCUMENTS

| | | | |
|---|---|---|---|
| 1,776,935 | 9/1930 | Snyder | 410/30 |
| 2,237,471 | 4/1941 | Billings | 244/105 |
| 2,261,751 | 11/1941 | Brintnell | 244/108 |
| 2,483,078 | 9/1949 | Williams | 244/115 |
| 2,514,470 | 7/1950 | Call | 244/108 |
| 2,957,661 | 10/1960 | Bergh et al. | 244/115 |
| 3,954,197 | 5/1976 | Dean | 244/114 R |
| 4,399,893 | 8/1983 | Switzer | 188/32 |
| 4,936,420 | 6/1990 | Nenstiel | 244/115 |

FOREIGN PATENT DOCUMENTS 617573  2/1927  France ................................. 244/15

*Primary Examiner*—Galen Barefoot

[57] ABSTRACT

A restraint device for an aircraft having a plurality of covered wheels with tires thereon, comprised of a base plate upon which is mounted a vertical restraint member attached to the side portion of the base plate. Positioned atop the vertical restraint is a landing gear strut attachment fitting which accepts the landing gear strut while adequately clearing the wheel fairing device.

5 Claims, 1 Drawing Sheet

SAFE START

CROSS REFERENCES TO RELATED APPLICATIONS

1. U.S. Pat. No. 4,936,420

BACKGROUND OF THE INVENTION

1. Field of Invention

The invention relates generally to an aircraft restraint device for aircraft equipped with covered wheel assemblies to reduce wind drag.

2. Description of Prior Art

The prior art in restricting the movement of an aircraft while starting the engine by hand propping the propeller, are the use of small chocks forward of the aircraft tire. The risks of the aircraft jumping the chocks and injuring persons and property is very high.

U.S. Pat. No. 4,936,420 addresses this problem in a more secure manor, by providing front and rear guard elements that the wheel cannot jump out of. The prior art does not adequately provide a solution to the restraint problem when the aircraft is using wheel fairing devices over the wheel assemblies. The wheel fairings are very light weight in design and are fragile.

An object of this invention is to allow use of wheel fairings while providing positive restraint to the aircraft during engine start up.

It is an object of this device to be less costly to manufacture, easier to carry, and lighter in weight than the prior patent. This invention can be used on aircraft with or without wheel fairings and with varying ground conditions.

It is also intended to improve security to parked aircraft by simply securing a cable, etc., around aircraft landing gear strut and vertical restraint and pad locking.

BRIEF SUMMARY OF THE INVENTION

The invention provides restraint for aircraft by retention of the landing gear strut. The landing gear strut is held secure by a vertical restraint member that is equipped at its top end with a landing gear attachment fitting that engages and matches the contour of the landing gear strut. Adequately clearing the wheel fairing device, the lower end of the vertical restraint is attached to the base plate.

DESCRIPTION OF PREFERRED EMBODIMENT

Figure 1:
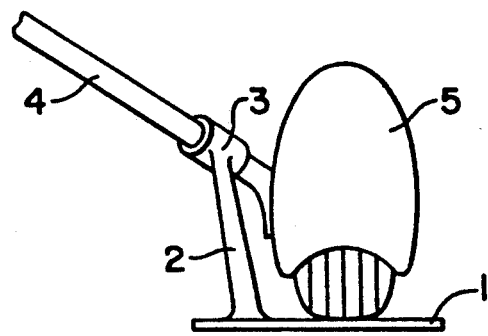
FIG. 1 is an end view of the device showing attachment to a tubular landing gear strut.
Figure 2:
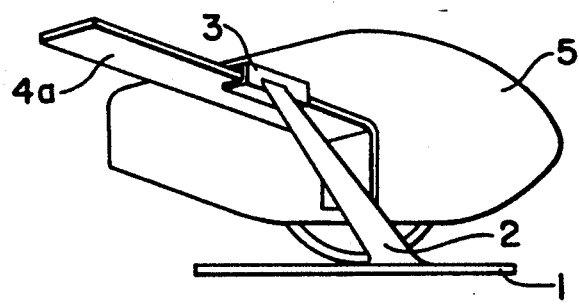
FIG. 2 is a side view of the device showing attachment to a spring steel type landing gear strut.
Figure 3:
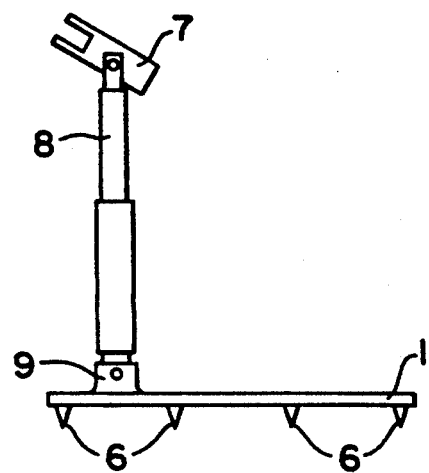
FIG. 3 is an end view of the device showing a telescoping vertical restraint with a moveable base, and moveable landing gear attachment fitting and horizontal movement resisters protruding from the bottom surface of the base plate.

Referring to FIGS. 1 and 2, there is shown a typical covered aircraft wheel assembly utilizing a fairing 5 to reduce wind drag. The covered aircraft tire is resting on a base plate 1 which provides a mounting base plate for a vertical restraint 2 along one side portion of the base plate. Positioned at the opposite end of the vertical restraint 2, is a suitable aircraft landing gear strut attachment fitting which fits harmoniously with the aircraft landing gear strut 4 (tubular type, FIG. 1), or aircraft landing gear strut 4a (flat spring steel type, FIG. 2). FIG. 3 shows the device with a telescoping vertical restraint 8 and a vertical restraint moveable base 9. The opposite end from the vertical restraint moveable based 9, is equipped with a moveable landing gear attachment fitting 7 (fitting shown is for flat spring steel type, landing gear strut). Items 7, 8, and 9 will allow the device's position to be change to varying aircraft dimensions, it also provides folding capabilities for carrying. Base plate 1 is shown equipped with horizontal movement registers to engage with varying ground conditions.

I claim:

1. A restraining device for an aircraft having a plurality of wheels with tires thereon, covered by wheel coverings and supported by aircraft landing gear struts which comprises: a base plate means including side and end portions comprising a generally flat platform for one of said tires to roll onto and rest upon, and having a rigid vertical restraint means fixedly attached to one side portion of said base plate, constrained from any movement in a direction parallel to the direction of rolling movement of said tire on said flat platform and extending upwards therefrom with the opposite end of said vertical restraint being fixedly attached to a landing gear strut attachment fitting, said fitting being shaped to directly engage said aircraft landing gear strut at a point along its forward facing surface, which prevents movement of said tire over said base plate means and does not engage the wheel or the wheel covering.

2. The device as described in claim 1 wherein: said vertical restraint means is variable in height comprising a telescoping vertical restraint means in which the longitudinal dimension increases and decreases by means of a series of decreasing diameter tubes sliding inside one another.

3. The device as described in claim 2 wherein: said telescoping vertical restraint means is hingedly attached to said base plate means by a vertical restraint moveable base which allows a radial movement perpendicular to the rolling direction of said wheel on said base plate means.

4. The device as described in claim 3 wherein: the upper end of said telescoping vertical restraint means is equipped with a moveable landing gear attachment fitting comprising a pivotally mounted device that compensates for the difference in engagement angle between said aircraft landing gear strut and said landing gear attachment fitting as said telescoping vertical restraint is adjusted through said radial movement.

5. The device as described in claim 1 wherein: said base plate means can be equipped with movement resisters comprising fixedly attached projecting elements facing in a downward direction from the bottom surface of said base plate means to solidly engage a variety of ground surfaces.

* * * * *